(12) United States Patent
Hirai (10) Patent No.: US 8,808,008 B2
(45) Date of Patent: Aug. 19, 2014

(54) ROTATABLE CONNECTOR DEVICE

(71) Applicant: Shuji Hirai, Shiga (JP)

(72) Inventor: Shuji Hirai, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 4 days.

(21) Appl. No.: 13/632,855

(22) Filed: Oct. 1, 2012

(65) Prior Publication Data
US 2013/0095672 A1    Apr. 18, 2013

Related U.S. Application Data

(63) Continuation of application No. PCT/JP2011/057340, filed on Mar. 25, 2011.

(30) Foreign Application Priority Data

Mar. 30, 2010   (JP) ................................ 2010-076527

(51) Int. Cl.
  *H01R 39/00* (2006.01)
  *B60R 16/027* (2006.01)
  *H01R 35/02* (2006.01)
  *H01R 43/00* (2006.01)

(52) U.S. Cl.
  CPC ............. *H01R 39/00* (2013.01); *B60R 16/027* (2013.01); *H01R 35/025* (2013.01); *H01R 43/002* (2013.01)
  USPC .......................................................... 439/15

(58) Field of Classification Search
  CPC .... H01R 35/025; H01R 35/04; B60R 16/027; H02G 11/00; B62D 1/10
  USPC ......................................... 439/15, 11, 13, 164
  See application file for complete search history.

(56) References Cited

U.S. PATENT DOCUMENTS 5,061,195 A  *  10/1991   Bolen ........................... 439/164
5,429,517 A  *  7/1995   Bolen ........................... 439/164

(Continued)

FOREIGN PATENT DOCUMENTS

JP         11-265773 A      9/1999
JP      2000-068020 A      3/2000

(Continued)

OTHER PUBLICATIONS

International Search Report issued in PCT/JP2011/057340, mailed on May 10, 2011 (6 pages).

*Primary Examiner* — Amy Cohen Johnson
*Assistant Examiner* — Vladimir Imas
(74) *Attorney, Agent, or Firm* — Osha Liang LLP (57) ABSTRACT

A rotatable connector device has a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate. The rotator and the stator are engaged with each other, so as to be pivotable with respect to each other with a gap being provided between the rotatable-side ring plate and the outer cylindrical section. An accommodation section, defined by the rotatable-side ring plate and the inner cylindrical section of the rotator and the fixed-side ring plate and the outer cylindrical section of the stator, accommodates a cable for electrically connecting the rotator and the stator to each.

9 Claims, 7 Drawing Sheets

(56) References Cited

U.S. PATENT DOCUMENTS

| | | | |
|---|---|---|---|
| 5,460,535 A * | 10/1995 | Bolen | 439/164 |
| 5,752,844 A * | 5/1998 | Kawamoto | 439/164 |
| 5,971,781 A * | 10/1999 | Lagier | 439/164 |
| 6,019,621 A * | 2/2000 | Sugata et al. | 439/164 |
| 6,152,394 A * | 11/2000 | Sakata et al. | 242/388 |
| 6,196,488 B1 * | 3/2001 | Sakata et al. | 242/388 |
| 6,435,886 B2 * | 8/2002 | Oguma | 439/164 |
| 6,764,326 B2 * | 7/2004 | Matsumoto et al. | 439/164 |
| 6,796,801 B2 * | 9/2004 | Hayashi | 439/15 |
| 7,175,454 B2 * | 2/2007 | Araki et al. | 439/164 |
| 7,445,451 B2 * | 11/2008 | Tanaka et al. | 439/15 |
| 7,452,224 B1 * | 11/2008 | McDonald et al. | 439/164 |
| 7,748,985 B2 * | 7/2010 | Kuerschner et al. | 439/15 |
| 7,758,363 B2 * | 7/2010 | Tanaka et al. | 439/164 |
| 7,775,800 B2 * | 8/2010 | Reischl et al. | 439/15 |

FOREIGN PATENT DOCUMENTS

| | | |
|---|---|---|
| JP | 2001-196145 A | 7/2001 |
| JP | 2001-270446 A | 10/2001 |

* cited by examiner

FIG.7

ROTATABLE CONNECTOR DEVICE

TECHNICAL FIELD

The present invention relates to a rotatable connector device mountable on a vehicle such as an automobile or the like, and specifically to a connector device usable for electrically connecting elements on the side of a steering wheel and a vehicle body side to each other.

BACKGROUND ART

A rotatable connector device such as a steering roll connector or the like which is mountable on a vehicle such as an automobile or the like includes a cable housing having a stator (fixed case) and a rotator (rotatable case) which are coaxially attached to each other so as to be rotatable with respect to each other.

In the cable housing of such a rotatable connector device, the stator is fixed to a vehicle body and the rotator is attached to the steering wheel. In addition, the rotatable connector device electrically connects the vehicle body side and elements on the side of the steering wheel, for example, a horn module, an airbag module and the like via flat cables accommodated in an accommodation space in the cable housing.

Patent Document 1 describes an example of such a rotatable connector device. A retainer (guide member) for guiding flat cables (band-like transmission lines) accommodated in an accommodation space (ring-shaped space) formed in a cable housing is located on a bottom surface of the accommodation space.

The retainer includes a plate-like guide ring which is C-shaped when seen in a plan view and is located on the bottom surface of the accommodation space so as to be rotatable around a rotation axis of a rotator, and a plurality of rollers axially supported so as to be rotatable around a rotation axis parallel to the rotation axis of the rotator. The guide ring is equally divided into a plurality of areas in a circumferential direction thereof, and the plurality of rollers are respectively provided in the plurality of areas.

The flat cables are accommodated in the accommodation space in a wound state. Inner ends of the flat cables in a radial direction are wound around an inner cylindrical section (inner cylindrical axial section) of the rotator, and outer ends of the flat cables in the radial direction are wound around an outer circumferential cylindrical section (outer cylindrical section) of a stator. An intermediate portion of the flat cables is turned around in a U shape.

Figure 7:
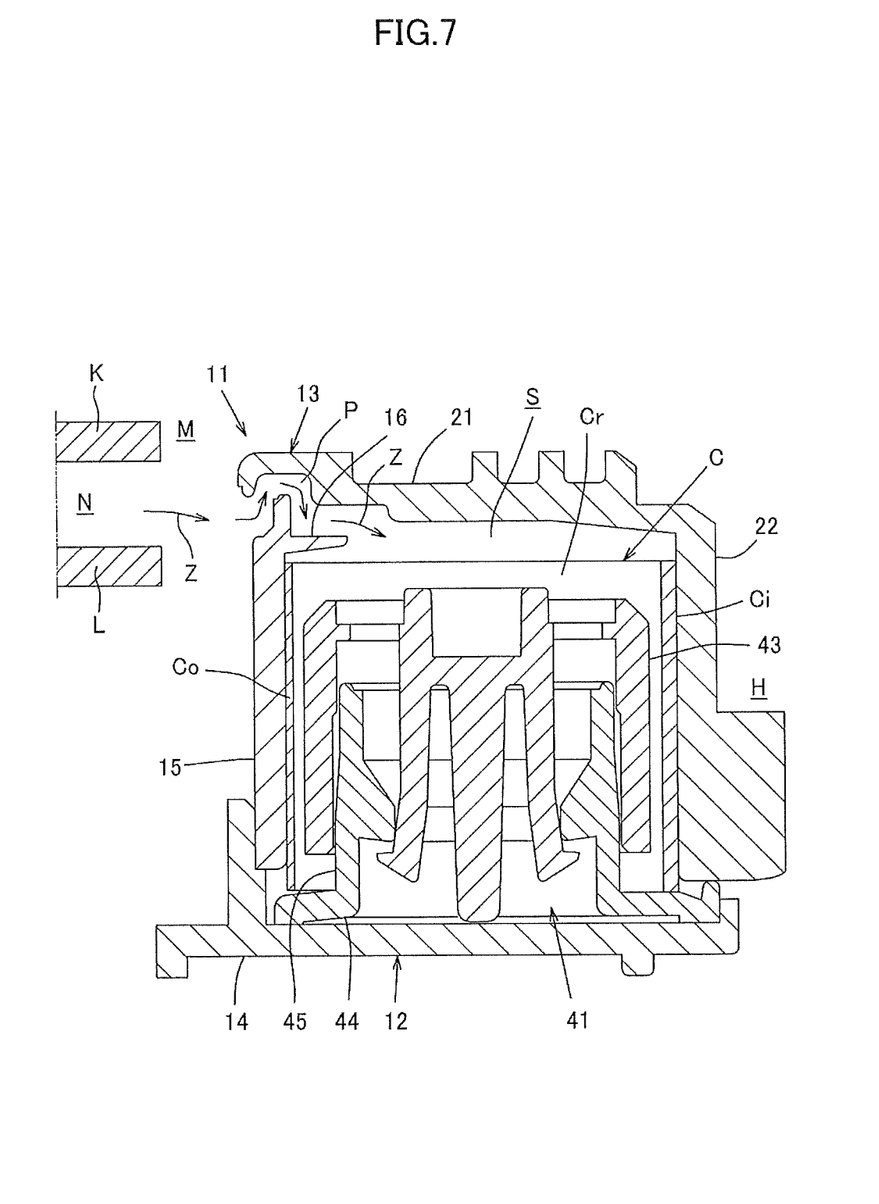
FIG. 7 is an enlarged end view showing a part of a conventional steering roll connector.

As shown in FIG. 7, a steering column cover includes a steering lower cover K and a column cover L, and an opening M is formed to communicate between the steering lower cover K and the column cover L. The rotatable connector is accommodated in the opening M on the side of the column cover L.

However, the rotatable connector has the following problem. A clearance N is formed between the steering lower cover K and the column cover L. A gap P is formed between a circumferential edge of a stator 12 and a circumferential edge of a rotator 13 facing the circumferential edge of the stator 12, and the gap P is located so as to face an intermediate position of the clearance N. Therefore, a foreign object Z such as, for example, sand, trash, dust or the like is likely to enter an accommodation space S in a cable housing 11 through the gap P between the stator 12 and the rotator 13.

When the foreign object Z enters the accommodation space S in the cable housing 11 through the gap P between the stator 12 and the rotator 13 in this manner, flat cables C which are wound or unwound by relative pivoting of the stator 12 and the rotator 13 are rubbed with each other. As a result, there occur problems that the flat cables C are broken, lamination covers of the flat cables C are delaminated to cause shortcircuiting, or an unusual sound is generated when the flat cables C are rubbed with each other. There is another problem that the resistance against pivoting of the stator 12 and the rotator 13 is increased to deteriorate the operability of the rotatable connector.

CITATION LIST

Patent Literature

Patent Document 1: Japanese Laid-Open Patent Publication No. 2000-68020

SUMMARY OF INVENTION

Technical Problem

The present invention has an object of providing a rotatable connector device capable of decreasing the amount of a foreign object entering an accommodation space.

Solution to Problem

The present invention is directed to a rotatable connector device, comprising a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate. The rotator and the stator are engaged with each other so as to be pivotable with respect to each other with a gap being provided between the rotatable-side ring plate and the outer cylindrical section. An accommodation section, defined by the rotatable-side ring plate and the inner cylindrical section of the rotator and the fixed-side ring plate and the outer cylindrical section of the stator, accommodates a cable for electrically connecting the rotator and the stator to each other in the state where the cable is wound around. Either one of outer circumferential edge sections of the rotator and the stator is formed to have a longer diameter than a diameter of the other of the outer circumferential edge sections. The one outer circumferential edge section formed to have the longer diameter is extended in such a direction as to cover a side surface of the other outer circumferential edge section, and the gap formed between the rotator and the stator is opened in a direction crossing a diametric direction.

According to the present invention, since a certain distance of the gap communicating between the accommodation space and the outside of the device can be securely obtained, a foreign object cannot easily enter the accommodation space. Therefore, the amount of the foreign object entering the accommodation space can be decreased as compared with in the conventional structure.

In more detail, when the rotatable connector device having the above-described structure is accommodated on the column cover side of an opening formed between the steering lower cover and the column cover which form a steering column cover, a foreign object enters the accommodation space from the clearance between the steering lower cover and the column cover through the gap between the rotator and the stator. However, since the gap between the rotator and the stator is opened in a direction crossing the clearance between the steering lower cover and the column cover, the foreign object proceeds in the direction crossing the clearance to enter the accommodation space.

Owing to this, the foreign object cannot easily enter the accommodation space and thus the amount of the foreign object entering the accommodation space can be decreased as compared with in the conventional structure. As a result, an inconvenience such as the breakage of the flat cables, delamination of the lamination covers of the flat cables to cause shortcircuiting, or generation of an unusual sound can be prevented.

In an embodiment of the present invention, the outer circumferential edge section of the stator formed to have a cylindrical shape may be formed to have a longer diameter than a diameter of the outer circumferential edge section of the rotator; and the outer circumferential edge section of the stator may be extended in such a direction as to cover a side surface of the outer circumferential edge section of the rotator, so that the gap is opened upward.

According to the present invention, in order to enter the accommodation space inside the device through the clearance between the steering lower cover and the column cover, the foreign object needs to enter the gap, opened upward in the rotatable connector device, from above, proceed downward, and then change the proceeding direction to the diametric direction to invade the accommodation space. Therefore, the foreign object cannot easily enter the accommodation space and thus the amount of the foreign object entering the accommodation space can be decreased.

In an embodiment of the present invention, in the state where the rotatable connector device is accommodated inner to a column cover which is located on the side of a vehicle and faces, at a prescribed distance from, a steering lower cover rotatable together with a steering wheel, an open end of the gap opened upward may be located at a higher position than an inner circumferential edge of a clearance of the prescribed distance formed between the steering lower cover and the column cover.

The above-described inner circumferential edge is an inner circumferential edge, in the diametric direction, of the clearance formed between the steering lower cover and the column cover; namely, is considered as the inner circumferential edges of the steering lower cover and the column cover facing each other.

According to the present invention, in order to enter the accommodation space inside the device through the clearance between the steering lower cover and the column cover, the foreign object needs to once bypass the outer circumferential edge section of the stator and enter the open end of the gap, opened upward, from above. Therefore, the amount of the foreign object entering the accommodation space from the open end is decreased. Thus, the amount of the foreign object entering the accommodation space can be further decreased.

In an embodiment of the present invention, the outer circumferential edge section of the rotator may be formed to have a diameter longer than a diameter of the outer circumferential edge section of the stator formed to have a cylindrical shape; and the outer circumferential edge section of the rotator may be extended in such a direction as to cover an outer circumferential surface of the stator along the outer circumferential surface, so that the gap is opened downward.

According to the present invention, in order to enter the accommodation space inside the device through the clearance between the steering lower cover and the column cover, the foreign object needs to enter the gap, opened downward in the rotatable connector device, from below, proceed upward against the weight of the foreign object, and then change the proceeding direction to the diametric direction to invade the accommodation space. Therefore, the foreign object cannot easily enter the accommodation space and thus the amount of the foreign object entering the accommodation space can be decreased.

In an embodiment of the present invention, in the state where the rotatable connector device is accommodated inner to a column cover which is located on the side of a vehicle and faces, at a prescribed distance from, a steering lower cover rotatable together with a steering wheel, an open end of the gap opened downward may be located at a lower position than an inner circumferential edge of a clearance of the prescribed distance formed between the steering lower cover and the column cover.

According to the present invention, in order to enter the accommodation space inside the device through the clearance between the steering lower cover and the column cover, the foreign object needs to once bypass the outer circumferential edge section of the rotator and enter the open end of the gap, opened downward, from below. Therefore, the amount of the foreign object entering the accommodation space from the open end is decreased. Thus, the amount of the foreign object entering the accommodation space can be further decreased.

In an embodiment of the present invention, the stator has an inner circumferential edge section, having a shorter diameter than the diameter of the outer circumferential edge section of the stator, formed inner to the outer circumferential edge section, and a groove communicating to the gap may be formed between the outer circumferential edge section and the inner circumferential edge section.

According to the present invention, the foreign object is likely to stay in the groove formed between the outer circumferential edge section and the inner circumferential edge section of the stator because of the weight of the foreign object, and thus the amount of the foreign object entering the accommodation space can be further decreased.

In an embodiment of the present invention, the groove may be formed continuously in a circumferential direction along the outer circumferential edge section of the stator.

According to the present invention, regardless of the direction in which the foreign object enters the gap with respect to the circumference (360 degrees), the foreign object is likely to stay in the groove formed continuously in the circumferential direction. As a result, the amount of the foreign object entering the accommodation space from any position along the circumference can be decreased.

Advantageous Effects of Invention

According to the present invention, the gap formed between the rotator and the stator is opened in a direction crossing the diametric direction. Therefore, the foreign object cannot easily enter the accommodation space of the rotatable connector device from the clearance between the steering lower cover and the column cover, and thus the amount of the foreign object entering the accommodation space can be decreased as compared with in the conventional structure. Owing to this, the breakage of the flat cables, delamination of the lamination covers of the flat cables to cause shortcircuiting, or generation of an unusual sound can be prevented.

DESCRIPTION OF EMBODIMENTS

Hereinafter, an embodiment of the present invention will be described with reference to the drawings.

As shown in FIG. 1 through FIG. 5, a steering roll connector 10 (SRC) in this embodiment includes a cable housing 11, a retainer 41, and a rotation lock unit 51.

Figure 1:
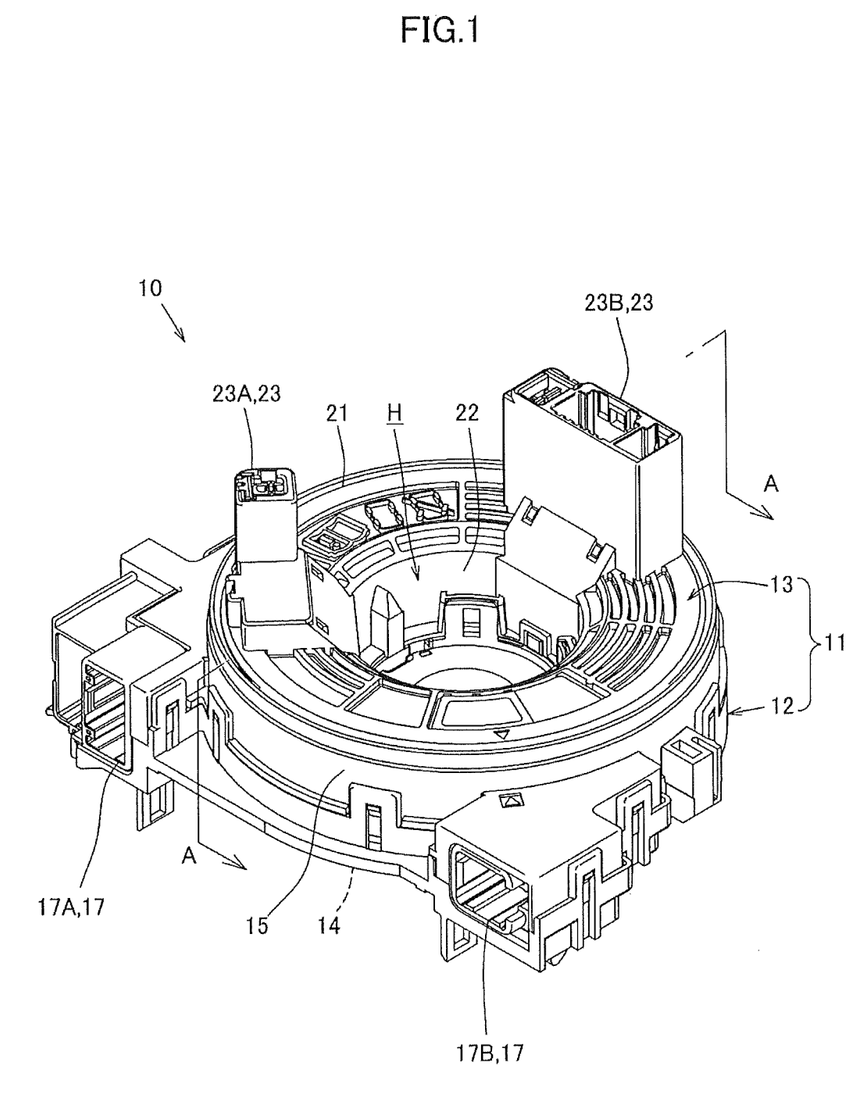
FIG. 1 is an external view of a steering roll connector in an embodiment.
Figure 2:
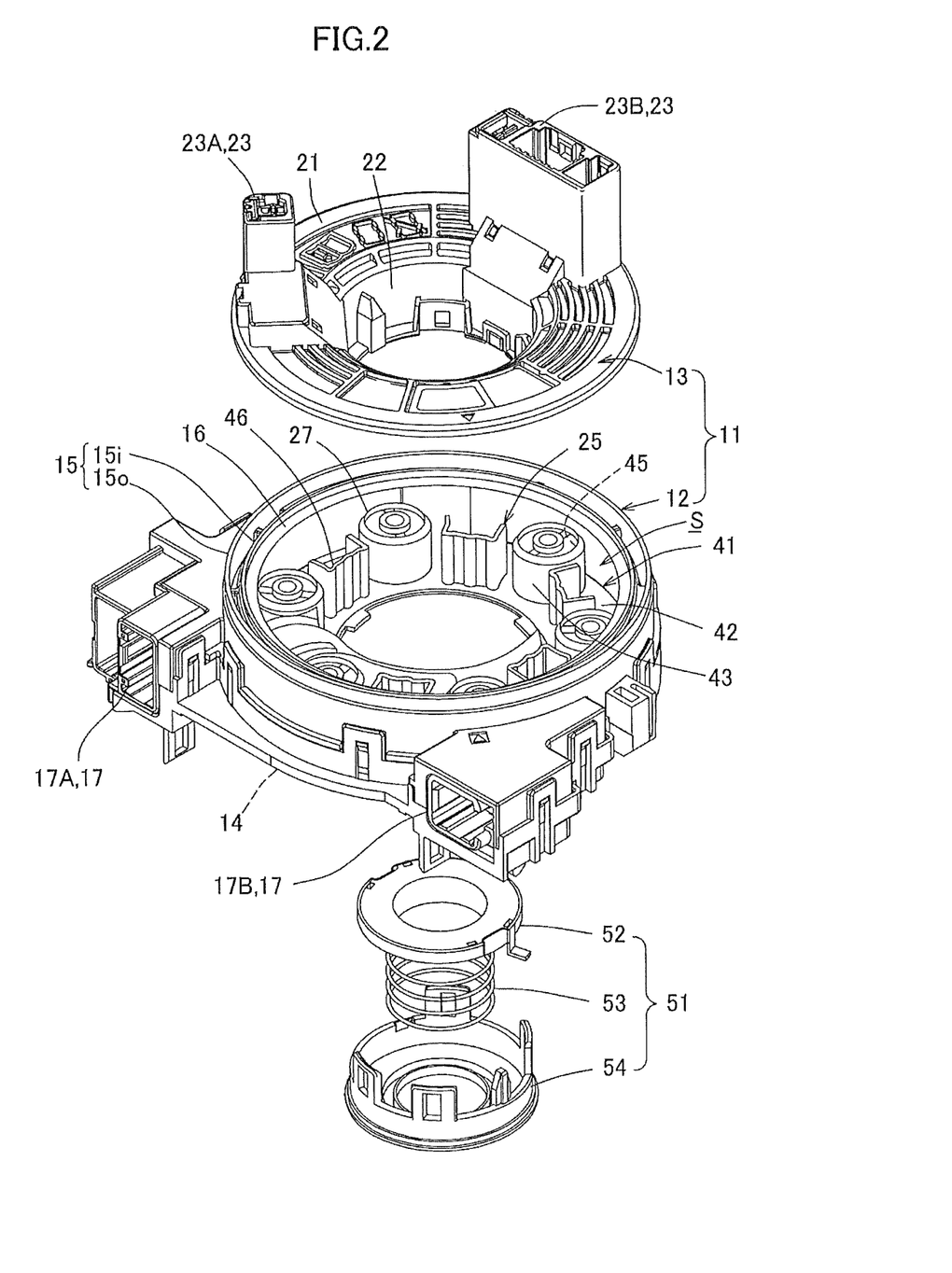
FIG. 2 is an exploded isometric view of the steering roll connector shown in FIG. 1.
Figure 3:
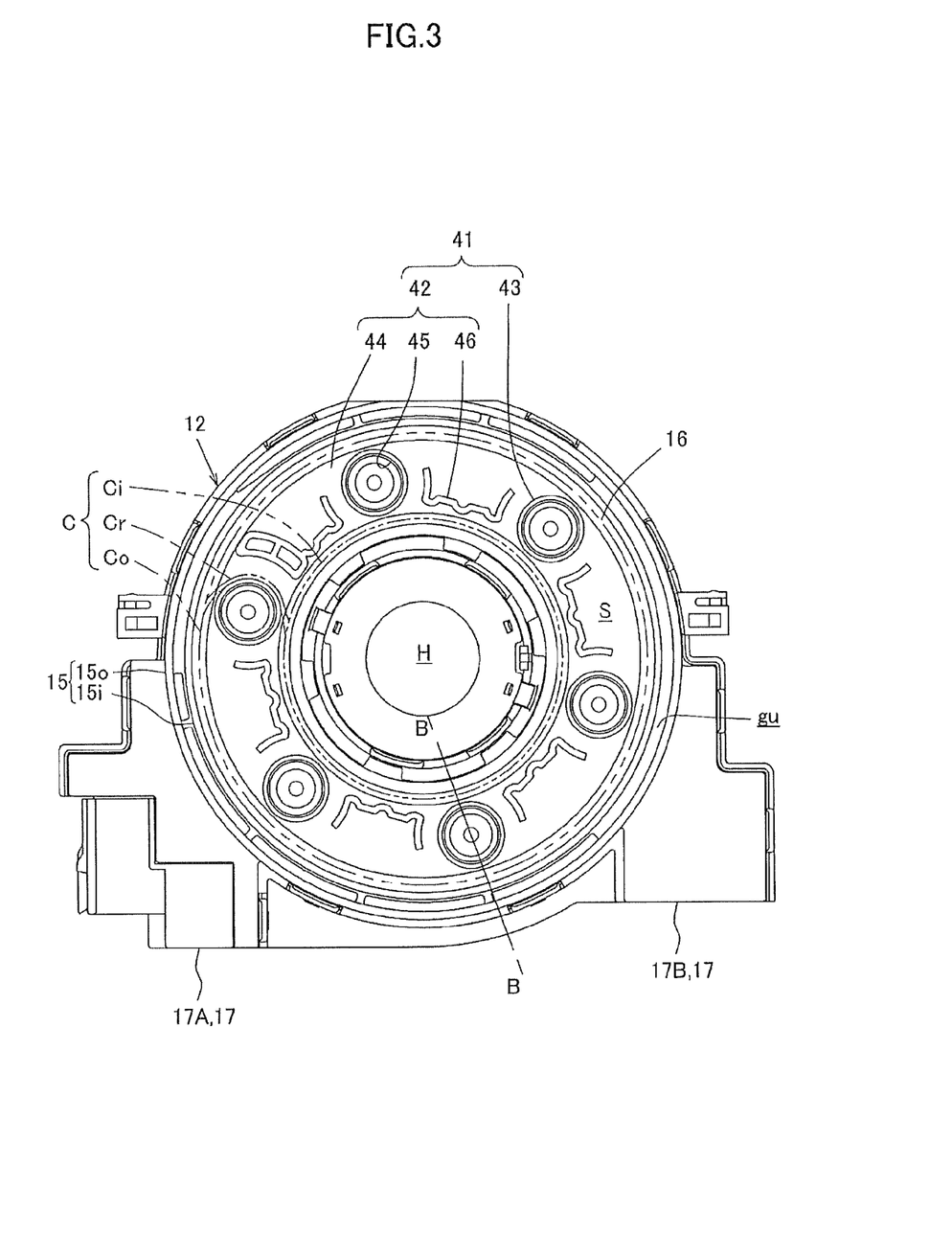
FIG. 3 is a plan view of the steering roll connector in the state where a rotator shown in FIG. 1 has been detached.
Figure 4:
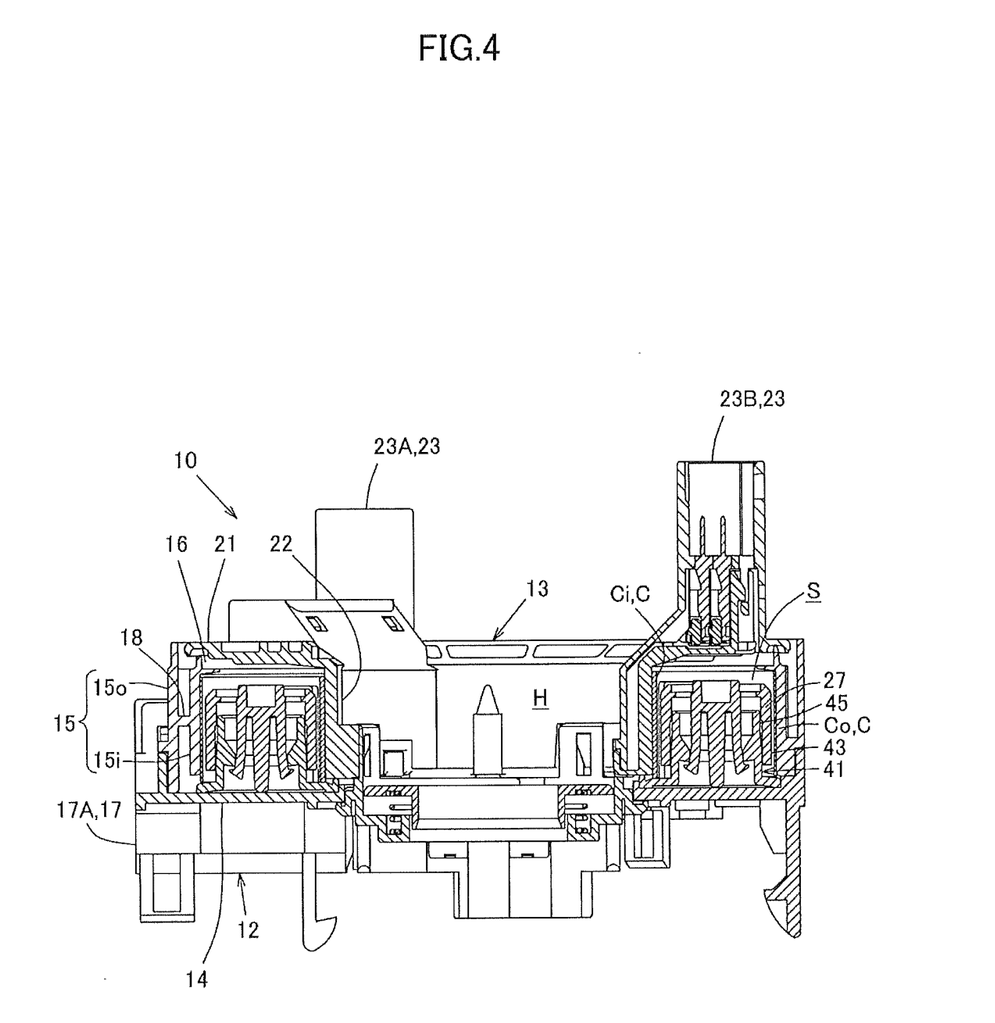
FIG. 4 is a cross-sectional view of FIG. 1 taken along line A-A in FIG. 1.
Figure 5:
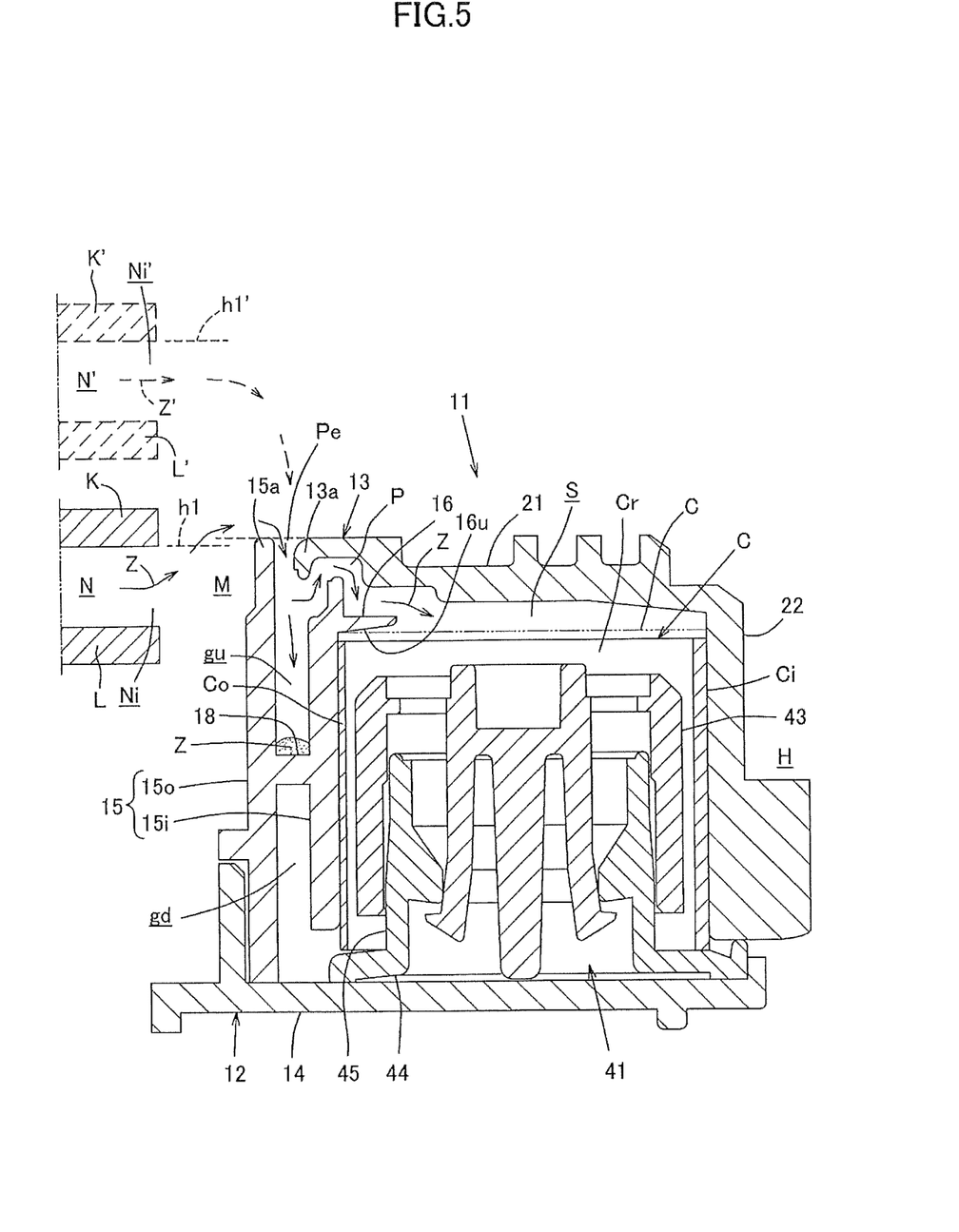
FIG. 5 is an enlarged end view showing a part of FIG. 4.

FIG. 1 and FIG. 2 are respectively an external view and an exploded isometric view of the steering roll connector. FIG. 3 is a plan view of the steering roll connector in the state where a rotator described later is detached. FIG. 4 is a cross-sectional view of FIG. 1 taken along line A-A in FIG. 1. FIG. 5 is an enlarged end view showing a part of FIG. 4.

The cable housing 11 is formed to have a generally cylindrical shape having an insertion hole H at a center thereof when seen in a plan view. The insertion hole H runs through the cable housing 11 in an axial direction of a steering shaft (not shown). The insertion hole H is formed to have a diameter which allows the steering shaft supported by the steering column mentioned above (not shown) to be inserted therethrough.

At a top end of the steering shaft, a steering wheel to be rotated is fixed.

The cable housing 11 includes a stator 12 and a rotator 13 engaged with each other so as to be pivotable with respect to each other. As shown in FIG. 2 through FIG. 5, in the cable housing 11, an accommodation space S is formed in which flexible flat cables C (hereinafter, referred to as the "flat cables C") are accommodated in the state of being wound around appropriately.

A steering column cover includes a steering lower cover K and a column cover L, and an opening M is formed to communicate between the steering lower cover K and the column cover L. The rotatable connector 10 is accommodated in the opening M on the side of the column cover L.

A gap P is formed between a circumferential edge of an outer cylindrical section 15 of the stator 12 and a circumferential edge of a rotatable-side ring plate 21 of the rotator 13 facing the circumferential edge of the outer cylindrical section 15. The gap P is formed continuously in a circumferential direction so as to communicate from the outside of the cable housing 11 to the accommodation space S. The gap P is provided for engaging the stator 12 and the rotator 13 with each other such that the stator 12 and the rotator 13 are pivotable with respect to each other.

In the state where the stator 12 and the rotator 13 are engaged with each other, the accommodation space S is defined by a fixed-side ring plate 14 and the outer cylindrical section 15 of the stator 14 and the rotatable-side ring plate 21 and an inner cylindrical section 22 of the rotator 13.

The stator 12 is fixed to an appropriate member on the side of a vehicle body, for example, a combination bracket switch (not shown) of the steering column, so as to be pivotable with respect to the steering wheel. The stator 12 includes the fixed-side ring plate 14 formed to be ring-shaped as a bottom plate and the outer cylindrical section 15 having a cylindrical shape and extending vertically from an outer circumferential edge of the fixed-side ring plate 14. The outer circumferential edge of the fixed-side ring plate 14 and a bottom end of the cylindrical section 15 are engaged with each other to be integral.

As shown in FIG. 4 and FIG. 5, the outer cylindrical section 15 has a two-layer structure including an outside outer cylindrical section 15o having a cylindrical shape and an inside outer cylindrical section 15i having a cylindrical shape. The inside outer cylindrical section 15i has a slightly shorter diameter than a diameter of the outside outer cylindrical section 15o and is formed inner to the outside outer cylindrical section 15o. The outside outer cylindrical section 15o and the inside outer cylindrical section 15i are located concentrically and face each other in a radial direction closely to each other.

The diameter of the outside outer cylindrical section 15o of the stator 12 is longer than a diameter of the outer circumferential edge 13a of the rotator 13. A top end 15a of the outside outer cylindrical section 15o is extended in a direction parallel to an axis of the stator 12, namely, upward, so as to cover a side surface of the outer circumferential edge 13a of the rotator 13.

Because of this, the gap P formed between the stator 12 and the rotator 13 is opened in an upward direction, which crosses (or is perpendicular to) the diametric direction of the stator 12 and the rotator 13.

The outside outer cylindrical section 15o and the inside outer cylindrical section 15i are coupled to each other to be integral via a coupling section 18 at an intermediate position in an axial direction of the steering wheel (up-down direction in FIG. 4 and FIG. 5). A gap made between the outside outer cylindrical section 15o and the inside outer cylindrical section 15i in the radial direction is divided into two in the up-down direction by the coupling section 18. As a result, as shown in FIG. 5, two grooves gu and gd opened upward and downward respectively are formed.

The groove gu opened upward is formed continuously in the circumferential direction along the outside outer cylindrical section 15o or the inside outer cylindrical section 15i around the axis of the stator 12 as the center.

As shown in FIG. 5, the inside outer cylindrical section 15i has a brim-like guide projection piece 16 in a top portion thereof, at a position above the flat cables C wound around in the accommodation spaces. The guide projection piece 16 projects inward in the radial direction (diametrically inner direction) toward the accommodation space S, and guides the flat cables C from above.

The guide projection piece 16 is ring-shaped when seen in a plan view and projects straight into the accommodation space S along an inner circumferential edge of the top portion of the inside outer cylindrical section 15i. A bottom surface 16u of the guide projection piece 16 is formed to be tapered, specifically, to be inclined upward in the radially inner direction.

To the stator 21, stator-side connectors 17 are attached.

The stator-side connectors 17 include a first stator-side connector 17A and a second stator-side connector 17B. The first stator-side connector 17A and the second stator-side connector 17B are located outer to the outer cylindrical section 15 (outside outer cylindrical section 15o) with a prescribed distance held therebetween such that respective connector connection openings are directed in the same direction.

The rotator 13 includes the rotatable-side ring plate (top board) 21 formed to be ring-shaped and the inner cylindrical section 22 having a cylindrical shape and extending vertically from an outer circumferential edge of the rotatable-side ring plate 21. The rotator 13 is structured to be rotatable integrally with the steering wheel. The rotator 13 is rotatable with respect to the stator 12 coaxially with a rotation axis of the steering wheel.

The rotatable-side ring plate 21 is located to face the fixed-side ring plate 14 in a direction of a rotation axis of the rotator 13.

The direction of the rotation axis of the rotator 13 is the same as the axial direction of the steering wheel described above (up-down direction in FIG. 4 and FIG. 5).

The inner cylindrical section 22 is located to face the outer cylindrical section 15 in the radial direction.

To the rotator 13, rotator-side connectors 23 are attached, which are rotatable integrally with the rotator 13 in accompaniment with the rotation of the rotator 13.

The rotator-side connectors 23 include a first rotator-side connector 23A and a second rotator-side connector 23B.

The first rotator-side connector 23A and the first stator-side connector 17A are electrically connected to each other via the flat cable C located in the accommodation space S. The second rotator-side connector 23B and the second stator-side connector 17B are electrically connected to each other via the flat cable C located in the accommodation space S.

The stator-side connectors 17 are each connected to a cable (not shown) drawn from an electrical circuit or the like on the vehicle body side in the column cover L (not shown).

The rotator-side connectors 23 are each connected to a cable (not shown) drawn from an electrical circuit or the like of, for example, a horn switch, an airbag switch or the like.

The above-mentioned retainer 41 includes a plurality of rotatable rollers 43 and a base ring 42, and is located to be rotatable in the accommodation space S around the rotation axis of the rotator 13.

The rotatable rollers 43 are provided by the same number as that of roller supporting projection sections 45 described later, and are axially supported by the roller supporting projection sections 45 respectively. The rotatable rollers 43 are each provided to be rotatable, with an axis parallel to the rotation axis of the rotator 13 being the rotation center.

The base ring 42 includes a plate-like base ring main body 44 having a ring shape when seen in a plan view, the roller supporting projection sections 45, and roller outside projection sections 46.

The base ring main body 44 is located close to the fixed-side ring plate 14 so as to be slidable with respect thereto, and is structured to be pivotable with respect to the stator 12. The roller supporting projection sections 45 are provided in a circumferential direction of the base ring main body 44 at an equal interval, and project upward so as to be capable of axially supporting the rotatable rollers 43.

The roller outside projection sections 46 each project upward with respect to the base ring main body 44 so as to guide a turned-around part (reversed part Cr described later) of the flat cables C, which is turned around and wound along the corresponding rotatable roller 43 as described later, from a diametrically outer side at a position outer to the roller supporting projection sections 45.

A structure of the rotation lock unit 51 mentioned above will be described in detail. As shown in FIG. 2, the rotation lock unit 51 includes a rock body 52, a spring receiving sleeve 54, and a return spring 53 provided between the lock body 52 and the spring receiving sleeve 54.

By pressing up the spring receiving sleeve 54 against an urging force of the return spring 53, the rotator 13 can be locked by means of the lock body 52 so as not to be rotatable with respect to the stator 12. Alternatively, by inserting a boss section (not shown) of a core bar of the steering wheel into the lock unit 51, the rotator 13 can be released from the locked state provided by the lock body 52 so as to be permitted to be freely rotatable with respect to the stator 12.

The flat cables C are band-like flexible transmission lines, each of which includes a plurality of flat straight-angle conductors Ca aligned parallel to each other at a prescribed pitch and is covered with an electrically insulating body Cb.

Two flat cables C are accommodated in the accommodation space S, and are wound around therein in a layered state.

One of the two layered flat cables C is connected to the first stator-side connector 17A at one end in a length direction thereof and is connected to the first rotator-side connector 23A at the other end (not shown).

The other of the two layered flat cables C is connected to the second stator-side connector 17B at one end in the length direction thereof and is connected to the second rotator-side connector 23B at the other end (not shown).

With such a structure, a portion of the layered flat cables C between the one end and the other end in the length direction is accommodated in the accommodation space S in an appropriately wound state.

In more detail, the flat cables C are drawn into the accommodation space S from the first stator-side connector 17A and the second stator-side connector 17B respectively, and thus as shown in FIG. 3 through FIG. 5, an outside wound part Co is formed which is wound along an inner circumferential surface of the outer cylindrical section 15 (inside outer cylindrical section 15i) of the stator 12 at a position outer to the retainer 41.

Accordingly, base ends of the outside wound part Co are fixed at the positions of the stator-side connectors 17.

The two flat cables C are wound around in the accommodated space S in a layered state as described above, but in FIG. 3 through FIG. 5, such a structure is simplified and only one wound flat cable C is shown.

As shown in FIG. 3, the layered flat cables C have the reversed part Cr in the middle thereof in the length direction. The reversed part Cr is turned around in a U shape and wound along one of the plurality of rotatable rollers 43.

After this part, the other end of the layered flat cables C in the length direction is formed to be an inside wound part Ci which is wound along an outer circumferential surface of the inner cylindrical section 22 of the rotator 13 at a position inner to the retainer 41. As shown in FIG. 3 through FIG. 5, the layered flat cables C are finally drawn out of the accommodation space S and connected to the first rotator-side connector 23A and the second rotator-side connector 23B.

Accordingly, base ends of the inside wound part Ci are fixed at the positions of the rotator-side connectors 23.

As described above, by the rotation of the rotator 13 with respect to the stator 12, the outside wound part Co and the inside wound part Ci of the flat cables C are respectively wound and unwound, or vice versa, in the accommodation space S.

In this state, the reversed part Cr of the flat cables C is appropriately rotated together with the retainer 41 so as to follow the change of balance in the wound state between the outside wound part Co and the inside wound part Ci. Owing to this, the steering roll connector 10 can always hold the flat cables C in an aligned wound state in the accommodation space S and can rotate the steering wheel smoothly.

As shown in FIG. 5, the steering roll connector 10 having such a structure is accommodated on the column cover L side in the opening M, which is formed to communicate between the steering lower cover K and the column cover L which form the steering column cover.

In this state, an open end Pe of the gap P opened upward is located at a higher position than a top end position h1 of an inside circumferential edge Ni of a clearance N, which is formed between the steering lower cover K and the column cover L.

The steering roll connector 10 described above can provide various functions and effects as described below.

As described above, the open end Pe of the gap P opened upward is located at a higher position than the top end position h1 of the clearance N. Therefore, in order to enter the accommodation space S inside the device, a foreign object Z needs to bypass the top end 15a extended upward from the outside outer cylindrical section 15o of the stator 12 and enter the open end Pe of the gap P, opened upward, from above. As a result, as compared with in the case where, for example, the open end Pe is at a lower position than a top end position h1' of a clearance N' represented by the dashed line in FIG. 5, the amount of the foreign object Z entering the open end Pe is decreased.

In order to enter the accommodation space S inside the device, the foreign object Z which has entered the open end Pe of the gap P, opened upward, from above needs to proceed downward from the open end Pe and then change the proceeding direction to the diametric direction to invade the accommodation space S. In addition, as compared with in the conventional structure shown in FIG. 7, the distance of the gap P communicating from the outside of the cable housing 11 to the accommodation space S is longer. Therefore, the foreign object cannot easily enter the accommodation space S, and thus the amount of the foreign object Z entering the accommodation space S can be decreased.

In this manner, the amount of the foreign object Z entering the accommodation space S is smaller than in the conventional structure shown in FIG. 7. As a result, the breakage of the flat cables C, delamination of the lamination covers of the flat cables C to cause shortcircuiting, or generation of an unusual sound can be prevented, which would otherwise occur when the stator 12 and the rotator 13 pivot with respect to each other.

The groove gu is formed continuously in the circumferential direction along the outside outer cylindrical section 15o and the inside outer cylindrical section 15i of the stator 12. Therefore, regardless of the direction in which the foreign object Z enters the gap P with respect to the circumference (360 degrees), the foreign object Z is likely to stay at a position in the groove gu formed continuously in the circumferential direction. As a result, the amount of the foreign object Z entering the accommodation space S from any position along the circumference can be decreased.

Figure 6:
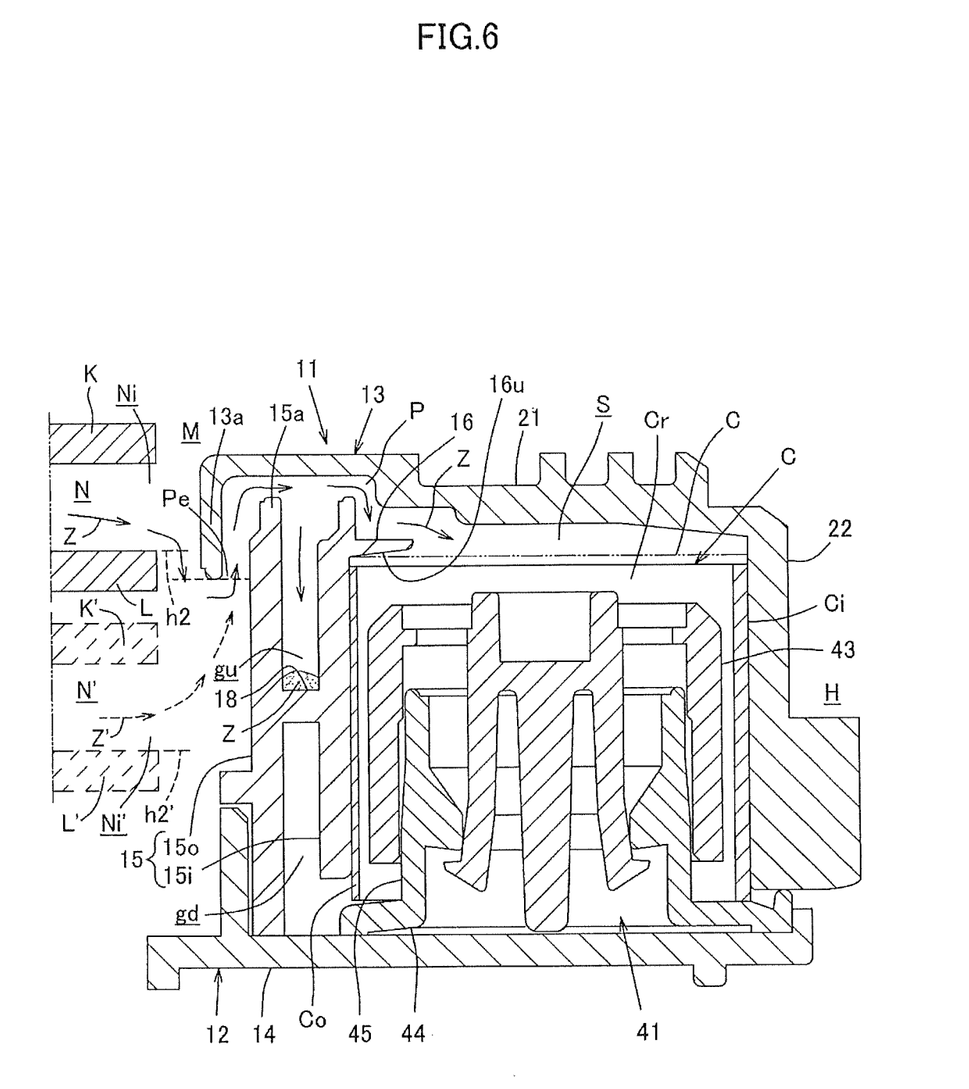
FIG. 6 is an enlarged end view showing a steering roll connector in another embodiment.

FIG. 6 is an enlarged end view showing a part of the steering roll connector 10 in another embodiment.

In the steering roll connector 10 in this embodiment, the outer circumferential edge 13a of the rotator 13 is extended in the diametric direction so as to have a longer diameter than the diameter of the outside outer cylindrical section 15o of the stator 12. In addition, the outer circumferential edge 13a of the rotator 13 is extended in a direction parallel to the axis of the rotator 13, namely, a downward direction, so as to cover an outer circumferential surface of the outside outer cylindrical section 15o along the outer circumferential surface of the outside outer cylindrical section 15o.

Therefore, the gap P is opened in a downward direction, which crosses (or is perpendicular to) the diametric direction of the stator 12 and the rotator 13.

As shown in FIG. 6, the steering roll connector 10 having the above-described structure is accommodated on the column cover L side in the opening M, which is formed to communicate between the steering lower cover K and the column cover L which form the steering column cover.

In this state, the open end Pe of the gap P opened downward is located at a lower position than a bottom end position h2 of the inside circumferential edge Ni of the clearance N formed between the steering lower cover K and the column cover L.

As described above, the open end Pe of the gap P opened downward is located at a lower position than the bottom end position h2 of the clearance N. Therefore, in order to enter the accommodation space S inside the device, a foreign object Z needs to bypass the outer circumferential edge 13a extended in the diametric direction of the rotator 13 and enter the open end Pe of the gap P, opened downward, from below. As a result, as compared with in the case where, for example, the open end Pe is at a higher position than a bottom end position h2' of a clearance N' represented by the dashed line in FIG. 6, the amount of the foreign object Z entering the open end Pe is decreased.

In order to enter the accommodation space S inside the device, the foreign object Z which has entered the open end Pe of the gap P, opened downward, from below needs to enter the open end Pe of the gap P opened downward in the steering roll connector 10 from below, then proceed upward against the weight of the foreign object Z, and then change the proceeding direction to the diametric direction to invade the accommodation space S. In addition, as compared with in the conventional structure shown in FIG. 7, the distance of the gap P communicating from the outside of the cable housing 11 to the accommodation space S is longer. Therefore, the foreign object Z cannot easily enter the accommodation space S, and thus the amount of the foreign object Z entering the accommodation space S can be decreased.

In this manner, the foreign object Z cannot easily enter the accommodation space S, and the amount of the foreign object Z entering the accommodation space S can be decreased as compared with in the conventional structure. As a result, this embodiment can provide the functions and effects equivalent to, or of a higher level than, those of the above-described embodiment.

In the another embodiment, elements identical to those of the previous embodiment bear the identical reference numerals thereto and detailed descriptions thereof are omitted.

The rotatable connector device according to the present invention corresponds to the steering roll connector 10 in the embodiments; and in the same manner, the cable corresponds to the flexible flat cable C;

the outer circumferential edge of the stator corresponds to the outside outer cylindrical section 15o of the outer cylindrical section 15; and the inner circumferential edge of the stator corresponds to the inside outer cylindrical section 15i of the outer cylindrical section 15i.

However, the present invention is not limited to the above-described embodiment, and can be applied to many other embodiments based on the technological philosophy presented in the claims.

REFERENCE SIGNS LIST

10 . . . Steering roll connector
11 . . . Cable housing
12 . . . Stator
13 . . . Rotator
13a . . . Outer circumferential edge
15 . . . Outer cylindrical section
15o . . . Outside outer cylindrical section
15i . . . Inside outer cylindrical section C . . . Flat cable
S . . . Accommodation space
K . . . Steering lower cover
L . . . Column cover
M . . . Opening
N . . . Clearance
Ni . . . Inside circumferential edge
P . . . Gap
Pe . . . Open end
Z . . . Foreign object
gu . . . Groove

The invention claimed is:

1. A rotatable connector device, comprising:
a rotator including a ring-shaped rotatable-side ring plate and an inner cylindrical section having a cylindrical shape and formed along an inner circumferential edge of the rotatable-side ring plate; and a stator including a ring-shaped fixed-side ring plate and an outer cylindrical section having a cylindrical shape and formed along an outer circumferential edge of the ring-shaped fixed-side ring plate, the rotator and the stator being engaged with each other so as to be pivotable with respect to each other with a gap being provided between the rotatable-side ring plate and the outer cylindrical section;
wherein:
an accommodation section, defined by the rotatable-side ring plate and the inner cylindrical section of the rotator and the fixed-side ring plate and the outer cylindrical section of the stator, accommodates a cable for electrically connecting the rotator and the stator to each other in the state where the cable is wound around;
the outer circumferential edge section of the stator formed to have a cylindrical shape is formed to have a longer diameter than a diameter of the outer circumferential edge section of the rotator;
the outer circumferential edge section of the stator is extended in such a direction as to cover a side surface of the outer circumferential edge section of the rotator, so that the gap is opened upward; and
the gap is connected to the accommodation section.

2. A rotatable connector device, comprising a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate, the rotator and the stator being engaged with each other so as to be pivotable with respect to each other with a gap being provided between the rotatable-side ring plate and the outer cylindrical section;
wherein an accommodation section, defined by the rotatable-side ring plate and the inner cylindrical section of the rotator and the fixed-side ring plate and the outer cylindrical section of the stator, accommodates a cable for electrically connecting the rotator and the stator to each other in the state where the cable is wound around;
wherein the outer circumferential edge section of the stator formed to have a cylindrical shape is formed to have a longer diameter than a diameter of the outer circumferential edge section of the rotator;
wherein the outer circumferential edge section of the stator is extended in such a direction as to cover a side surface of the outer circumferential edge section of the rotator, so that the gap is opened upward; and
wherein in the state where the rotatable connector device is accommodated inner to a column cover which is located on the side of a vehicle and faces, at a prescribed distance from, a steering lower cover rotatable together with a steering wheel, an open end of the gap opened upward is located at a higher position than an inner circumferential edge of a clearance of the prescribed distance formed between the steering lower cover and the column cover.

3. A rotatable connector device, comprising a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the ring-shaped fixed-side ring plate, the rotator and the stator being engaged with each other so as to be pivotable with respect to each other with a gap being provided between the rotatable-side ring plate and the outer cylindrical section;
wherein:
an accommodation section, defined by the rotatable-side ring plate and the inner cylindrical section of the rotator and the fixed-side ring plate and the outer cylindrical section of the stator, accommodates a cable for electrically connecting the rotator and the stator to each other in the state where the cable is wound around;
the outer circumferential edge section of the rotator is formed to have a diameter longer than a diameter of the outer circumferential edge section of the stator formed to have a cylindrical shape;
the outer circumferential edge section of the rotator is extended in such a direction as to cover an outer circumferential surface of the stator along the outer circumferential surface, so that the gap is opened downward; and
in the state where the rotatable connector device is accommodated inner to a column cover which is located on the side of a vehicle and faces, at a prescribed distance from, a steering lower cover rotatable together with a steering wheel, an open end of the gap opened downward is located at a lower position than an inner circumferential edge of a clearance of the prescribed distance formed between the steering lower cover and the column cover.

4. A rotatable connector device according to claim 1, wherein the stator has an inner circumferential edge section, having a shorter diameter than the diameter of the outer circumferential edge section of the stator, formed inner to the outer circumferential edge section, and a groove communicating to the gap is formed between the outer circumferential edge section and the inner circumferential edge section.

5. A rotatable connector device according to claim 4, wherein the groove is formed continuously in a circumferential direction along the outer circumferential edge section of the stator.

6. A rotatable connector device according to claim 2, wherein the stator has an inner circumferential edge section, having a shorter diameter than the diameter of the outer circumferential edge section of the stator, formed inner to the outer circumferential edge section, and a groove communicating to the gap is formed between the outer circumferential edge section and the inner circumferential edge section.

7. A rotatable connector device according to claim 6, wherein the groove is formed continuously in a circumferential direction along the outer circumferential edge section of the stator.

8. A rotatable connector device according to claim 3, wherein the stator has an inner circumferential edge section, having a shorter diameter than the diameter of the outer circumferential edge section of the stator, formed inner to the outer circumferential edge section, and a groove communicating to the gap is formed between the outer circumferential edge section and the inner circumferential edge section.

9. A rotatable connector device according to claim 8, wherein the groove is formed continuously in a circumferential direction along the outer circumferential edge section of the stator.

* * * * *